US012718730B2

(12) United States Patent
Choi et al.

(10) Patent No.: US 12,718,730 B2
(45) Date of Patent: Aug. 25, 2026

(54) DISPLAY DRIVING EMPLOYING DITHERING USING SHIFT VALUE BASED ON RANDOM NUMBER

(71) Applicant: SAMSUNG DISPLAY CO., LTD., Yongin-si (KR)

(72) Inventors: Kyungmin Choi, Yongin-si (KR); Jong-Woong Park, Yongin-si (KR); Wonbok Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/024,057

(22) Filed: Jan. 16, 2025

(65) Prior Publication Data

US 2025/0372018 A1 Dec. 4, 2025

(30) Foreign Application Priority Data

May 29, 2024 (KR) ........................ 10-2024-0069935

(51) Int. Cl.
*G09G 3/20* (2006.01)

(52) U.S. Cl.
CPC ... *G09G 3/2044* (2013.01); *G09G 2300/0842* (2013.01); *G09G 2310/0275* (2013.01); *G09G 2320/0247* (2013.01)

(58) Field of Classification Search
CPC ......... G09G 3/2044; G09G 2300/0842; G09G 2310/0275; G09G 2320/0247; G09G 3/2048; G09G 5/026; G09G 3/2055; G09G 3/32; G06F 3/064; H04N 1/58
See application file for complete search history.

(56) References Cited

U.S. PATENT DOCUMENTS

| | | | | |
|---|---|---|---|---|
| 10,444,419 | B2 | 10/2019 | Bhargava et al. | |
| 10,593,252 | B1 * | 3/2020 | Chappalli | G09G 3/2055 |
| 11,176,901 | B1 * | 11/2021 | Hunt | G09G 3/32 |
| 2007/0176949 | A1 * | 8/2007 | Chang | G09G 3/2048 345/690 |
| 2008/0055653 | A1 * | 3/2008 | Park | G09G 3/2055 358/3.19 |
| 2009/0154831 | A1 * | 6/2009 | Lee | H04N 1/58 382/269 |
| 2012/0133391 | A1 * | 5/2012 | Goh | G09G 3/2044 326/59 |

(Continued)

FOREIGN PATENT DOCUMENTS

| | | | |
|---|---|---|---|
| CN | 116895233 | A | 10/2023 |
| KR | 10-1378221 | B1 | 3/2014 |

(Continued)

*Primary Examiner* — Richard J Hong
(74) *Attorney, Agent, or Firm* — F. CHAU & ASSOCIATES, LLC

(57) ABSTRACT

A driving controller includes a memory configured to store dithering maps, a random number generator configured to generate a random number having a same initial value for each frame, and a dithering compensator circuit configured to select an intermediate dithering map among the dithering maps based on the random number, shift the intermediate dithering map based on the random number to generate a compensation dithering map, and spatially compensate input image data using the compensation dithering map.

20 Claims, 15 Drawing Sheets

(56) References Cited

U.S. PATENT DOCUMENTS

| | | | | |
|---|---|---|---|---|
| 2013/0141455 | A1* | 6/2013 | Wang | G09G 5/026 345/596 |
| 2017/0358255 | A1* | 12/2017 | Wang | G09G 3/2055 |
| 2022/0415234 | A1* | 12/2022 | Bhattacharjee | G09G 3/2048 |
| 2023/0087470 | A1* | 3/2023 | Kato | G06F 3/064 711/154 |
| 2023/0316980 | A1 | 10/2023 | Jang | |
| 2024/0135856 | A1* | 4/2024 | Lim | G09G 3/2044 |

FOREIGN PATENT DOCUMENTS

| | | | |
|---|---|---|---|
| KR | 10-2023-0143211 | A | 10/2023 |
| KR | 10-2679879 | B1 | 7/2024 |

* cited by examiner

FIG. 6

| TG | LSB | MID | | | |
|---|---|---|---|---|---|
| | | 0 | 1 | 2 | 3 |
| 0/16 | 0000 | 0 0 0 0<br>0 0 0 0<br>0 0 0 0<br>0 0 0 0 | 0 0 0 0<br>0 0 0 0<br>0 0 0 0<br>0 0 0 0 | 0 0 0 0<br>0 0 0 0<br>0 0 0 0<br>0 0 0 0 | 0 0 0 0<br>0 0 0 0<br>0 0 0 0<br>0 0 0 0 |
| 1/16 | 0001 | 0 1 0 0<br>0 0 0 0<br>0 0 0 0<br>0 0 0 0 | 0 0 0 0<br>0 0 1 0<br>0 0 0 0<br>0 0 0 0 | 0 0 0 0<br>0 0 0 0<br>1 0 0 0<br>0 0 0 0 | 0 0 0 0<br>0 0 0 0<br>0 0 0 0<br>0 1 0 0 |
| 2/16 | 0010 | 0 0 1 0<br>0 0 0 0<br>0 1 0 0<br>0 0 0 0 | 0 0 0 0<br>0 0 1 0<br>0 0 0 0<br>1 0 0 0 | 0 0 0 0<br>0 1 0 0<br>0 0 0 0<br>0 0 0 1 | 0 0 0 1<br>0 0 0 0<br>1 0 0 0<br>0 0 0 0 |
| | | ⋮ | | | |
| 14/16 | 1110 | 1 1 1 1<br>1 0 1 0<br>1 1 1 1<br>1 1 1 1 | 1 1 0 1<br>1 1 1 1<br>1 0 1 1<br>1 1 1 1 | 1 1 1 0<br>1 1 1 1<br>1 1 1 1<br>0 1 1 1 | 1 1 1 0<br>1 0 1 1<br>1 1 1 1<br>1 1 1 1 |
| 15/16 | 1111 | 0 1 1 1<br>1 1 1 1<br>1 1 1 1<br>1 1 1 1 | 1 1 1 1<br>1 1 1 1<br>1 0 1 1<br>1 1 1 1 | 1 1 1 1<br>1 1 0 1<br>1 1 1 1<br>1 1 1 1 | 1 1 1 1<br>1 1 1 1<br>1 1 1 1<br>0 1 1 1 |

| | GV1 | GV2 |
|---|---|---|
| 1ST | | |
| 2ND | 1 | 0 |
| 3RD | 0 | 0 |
| 4TH | 1 | 0 |

| RN | | | | | | | |
|---|---|---|---|---|---|---|---|
| 1BIT | 2BIT | 3BIT | 4BIT | 5BIT | 6BIT | 7BIT | 8BIT |
| 0 | 0 | 1 | 0 | 1 | 0 | 0 | 1 |
| 0 | 0 | 0 | 1 | 0 | 1 | 0 | 0 |
| 0 | 0 | 0 | 0 | 1 | 0 | 1 | 0 |
| 0 | 0 | 0 | 0 | 0 | 1 | 0 | 1 |

DISPLAY DRIVING EMPLOYING DITHERING USING SHIFT VALUE BASED ON RANDOM NUMBER

CROSS REFERENCE TO RELATED APPLICATION(S)

This application claims priority under 35 USC § 119 to Korean Patent Application No. 10-2024-0069935 filed on May 29, 2024 in the Korean Intellectual Property Office (KIPO), the entire disclosure of which is incorporated by reference herein.

Field

Embodiments of the present inventive concept relate to a driving controller, a display device including the driving controller, an electronic device including the display device, and a method of driving the driving controller. More particularly, the present inventive concept relates to display driving employing dithering.

Discussion of Related Art

In general, a display device includes a display panel and a display panel driver. The display panel includes gate lines, data lines, and pixels. The display panel driver includes a gate driver for providing gate signals to the gate lines, a data driver for providing data voltages to the data lines, and a driving controller for controlling the gate driver and the data driver.

A display device may use a data driver having data processing capability that is less than normally required to handle grayscale of a certain number of bits representing input image data received by a driving controller, for a cost reduction. To nevertheless process the grayscale without sacrificing (or minimally sacrificing) grayscale resolution, a data driver may perform a dithering operation to express the grayscale bits of the input image data.

A method of performing the dithering operation may include temporal dithering and spatial dithering. Temporal dithering may display a first reference grayscale and a second reference grayscale during a plurality of frames to express a target grayscale between the first reference grayscale and the second reference grayscale by a temporal combination. The target grayscale may be recognized by a user during the frames. Spatial dithering may display the first reference grayscale and the second reference grayscale on adjacent pixels to express the target grayscale between the first reference grayscale and the second reference grayscale by a spatial combination. Here, the target grayscale may be recognized by the user in the adjacent pixels.

SUMMARY

Embodiments of the present inventive concept provide a driving controller for improving display quality.

Embodiments of the present inventive concept provide a display device including the driving controller.

Embodiments of the present inventive concept provide an electronic device including the display device.

Embodiments of the present inventive concept provide a method of driving the driving controller.

In an embodiment of a driving controller according to the present inventive concept, the driving controller comprises a memory configured to store dithering maps, a random number generator configured to generate a random number having a same initial value for each frame, and a dithering compensator circuit configured to select an intermediate dithering map among the dithering maps based on the random number, shift the intermediate dithering map based on the random number to generate a compensation dithering map, and spatially compensate input image data using the compensation dithering map.

In an embodiment, the random number may have X bits (here, X is a positive integer), and the dithering compensator may be configured to select a map index of Y at least one bit (here, Y is a positive integer less than X) and a shift value of Z bit (here, Z is a positive integer less than X) based on the random number, select a grayscale low bit of the input image data, select the intermediate dithering map among the dithering maps based on the map index and the grayscale low bit, and shift the intermediate dithering map by the shift value to generate the compensation dithering map.

In an embodiment, a dithering cycle performed by the driving controller may be one frame or multiple times per frame.

In an embodiment, the dithering compensator may be configured to select a portion of X numbers included in the random number as the map index.

In an embodiment, the portion of the X numbers included in the random number selected as the map index may be adjacent to each other.

In an embodiment, each of the dithering maps may have N−M bits (here, N is a positive integer and M is a positive integer less than N) when a grayscale of the input image data is N bits and a data voltage output from a data driver is M bits.

In an embodiment, the grayscale low bit may be equal to a bit of each of the dithering maps.

In an embodiment, a number of the dithering maps may be 2Y×2N−M.

In an embodiment, the dithering compensator may be configured to select a portion of X numbers included in the random number as the shift value.

In an embodiment, the portion of the X numbers included in the random number selected as the shift value may be adjacent to each other.

In an embodiment, the compensation dithering map may be generated by at least partially horizontally shifting the intermediate dithering map.

In an embodiment, the compensation dithering map may be generated by vertically shifting the intermediate dithering map.

In an embodiment, a maximum value of the shift value may correspond to a number of pixels included in each of the dithering maps.

In an embodiment, a number of the compensation dithering map may be extended from a number of the dithering maps by the maximum value of the shift value.

In an embodiment of a display device according to the present inventive concept, the display device comprises a display panel including pixels, a data driver configured to provide a data voltage to the display panel, and a driving controller configured to control the data driver. The driving controller includes a memory configured to store dithering maps, a random number generator configured to generate a random number having a same initial value for each frame, and a dithering compensator circuit configured to select an intermediate dithering map among the dithering maps based on the random number, shift the intermediate dithering map based on the random number to generate a compensation dithering map, and spatially compensate input image data using the compensation dithering map.

In an embodiment, the random number may have X bit (here, X is a positive integer), and the dithering compensator may be configured to select a map index of Y bit (here, Y is a positive integer less than X) and a shift value of Z bit (here, Z is a positive integer less than X) based on the random number, select a grayscale low bit of the input image data, select the intermediate dithering map among the dithering maps based on the map index and the grayscale low bit, and shift the intermediate dithering map by the shift value to generate the compensation dithering map.

In an embodiment, a dithering cycle performed by the driving controller may be one frame.

In an embodiment, the dithering compensator may be configured to select a portion of X numbers included in the random number as the map index.

In an embodiment of an electronic device according to the present inventive concept, the electronic device comprises a display panel including pixels, a data driver configured to provide a data voltage to the display panel, a driving controller configured to control the data driver, and a power supply configured to provide a power to the display panel, the data driver, and the driving controller. The driving controller includes a memory configured to store dithering maps, a random number generator configured to generate a random number having a same initial value for each frame, and a dithering compensator circuit configured to select an intermediate dithering map among the dithering maps based on the random number, shift the intermediate dithering map based on the random number to generate a compensation dithering map, and spatially compensate input image data using the compensation dithering map.

In an embodiment of a method of driving a driving controller according to the present inventive concept, the method comprises generating a random number having a same initial value for each frame, selecting an intermediate dithering map among dithering maps based on the random number, shifting the intermediate dithering map based on the random number to generate a compensation dithering map, and spatially compensating input image data using the compensation dithering map.

According to the driving controller, the display device, and the method of driving the driving controller, the dithering map may be randomly selected based on the random number, and a spatial dithering may be performed based on the dithering map. In addition, since the random number is initialized with the same initial value for each frame, the dithering cycle may be one frame, the spatial dithering may be performed for each frame, and a temporal dithering may not be performed.

The maximum value of the shift value may correspond to the number of pixels included in each of the dithering maps. Since the dithering maps may be shifted by the maximum value of the shift value, the number of the compensation dithering maps may be extended by the maximum value of the shift value of the dithering maps. Accordingly, the spatial dithering may be performed more randomly. In addition, since a shift operation is performed through an operation of the dithering compensator, an amount of data stored in a memory may not increase.

BRIEF DESCRIPTION OF THE DRAWINGS

The above and other features of embodiments of the present inventive concept will become more apparent by describing in detailed embodiments thereof with reference to the accompanying drawings, in which:

FIG. 6 is a diagram showing dithering maps stored in a memory of FIG. 4;

DETAILED DESCRIPTION OF EMBODIMENTS

Hereinafter, embodiments of the present inventive concept will be described in more detail with reference to the accompanying drawings.

Figure 1:
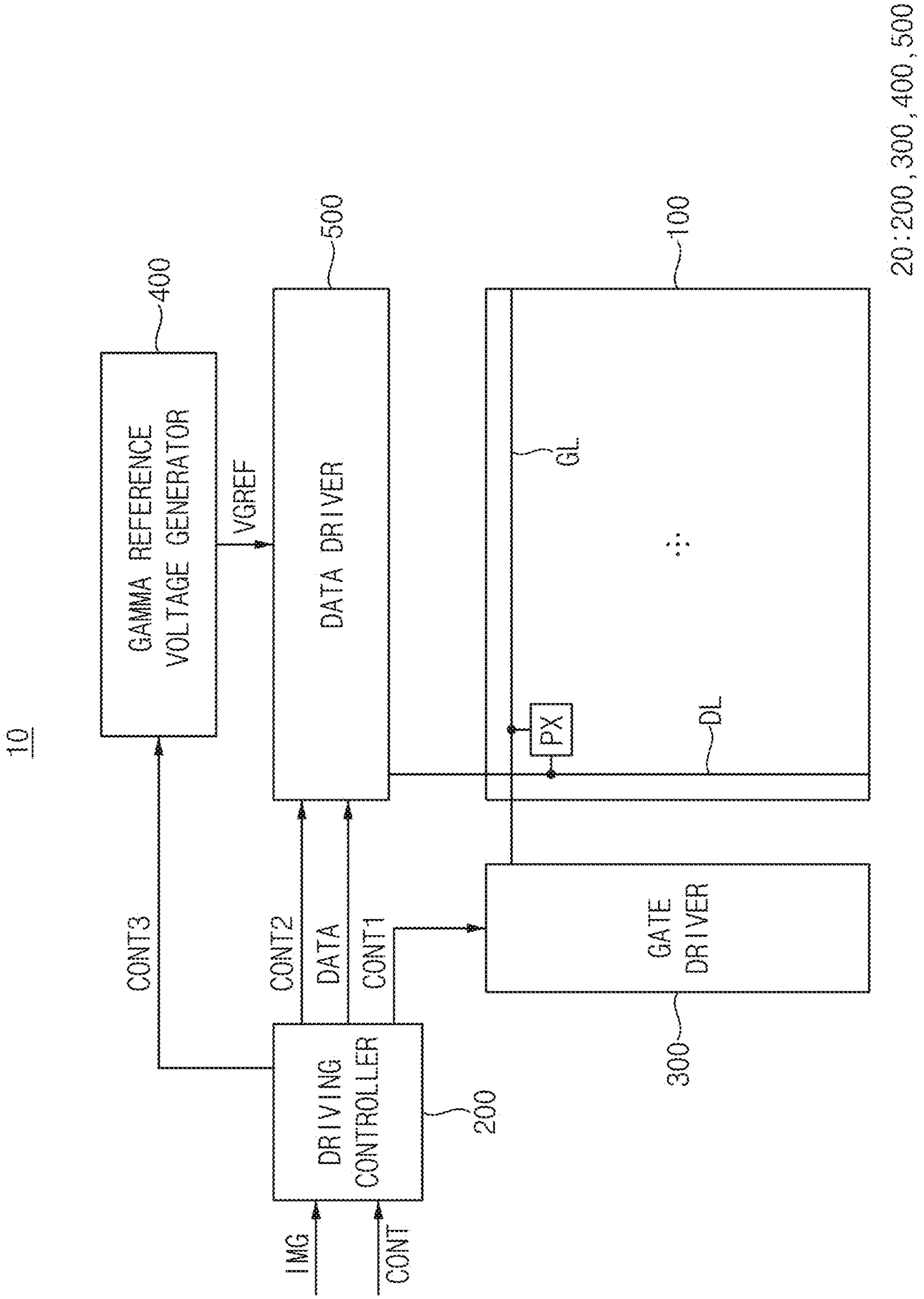
FIG. 1 is a block diagram showing a display device according to embodiments of the present inventive concept.

FIG. 1 is a block diagram showing a display device 10 according to embodiments of the present inventive concept.

Referring to FIG. 1, a display device 10 may include a display panel 100 and a display panel driver 20. The display panel driver 20 may include a driving controller 200, a gate driver 300, a gamma reference voltage generator 400, and a data driver 500.

For example, the driving controller 200 and the data driver 500 may be formed integrally. For example, the driving controller 200, the gamma reference voltage generator 400, and the data driver 500 may be formed integrally. For example, the driving controller 200, the gate driver 300, the gamma reference voltage generator 400, and the data driving 500 may be formed integrally. Meanwhile, a driving module in which at least the driving controller 200 and the data driver 500 are formed integrally may be called a timing controller embedded data driver (TED).

The display panel 100 may include a display area for displaying an image and a peripheral area disposed adjacent to the display area.

Some examples of the display panel 100 may include an organic light emitting diode (OLED) display panel including a multiplicity of OLEDs; a quantum-dot organic light emitting diode (QD-OLED) display panel including an OLED and a quantum-dot color filter; a quantum-dot nano light-emitting diode display panel including a nano light emitting diode and a quantum-dot color filter; and a liquid crystal display (LCD) panel including a liquid crystal layer.

The display panel 100 may include gate lines GL, data lines DL, pixels PX electrically connected to the gate lines GL and the data lines DL, respectively. The gate lines GL may extend in a first direction, and the data lines DL may extend in a second direction crossing the first direction.

The driving controller 200 may receive input image data IMG and an input control signal CONT from an external device (not shown). For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal (which may indicate the current being drawn by the display panel 100).

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral area of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or may be disposed in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into an analog type data voltage (a grayscale voltage) using the gamma reference voltage VGREF. The data driver 500 may output the data voltage to the data line DL.

Figure 2:
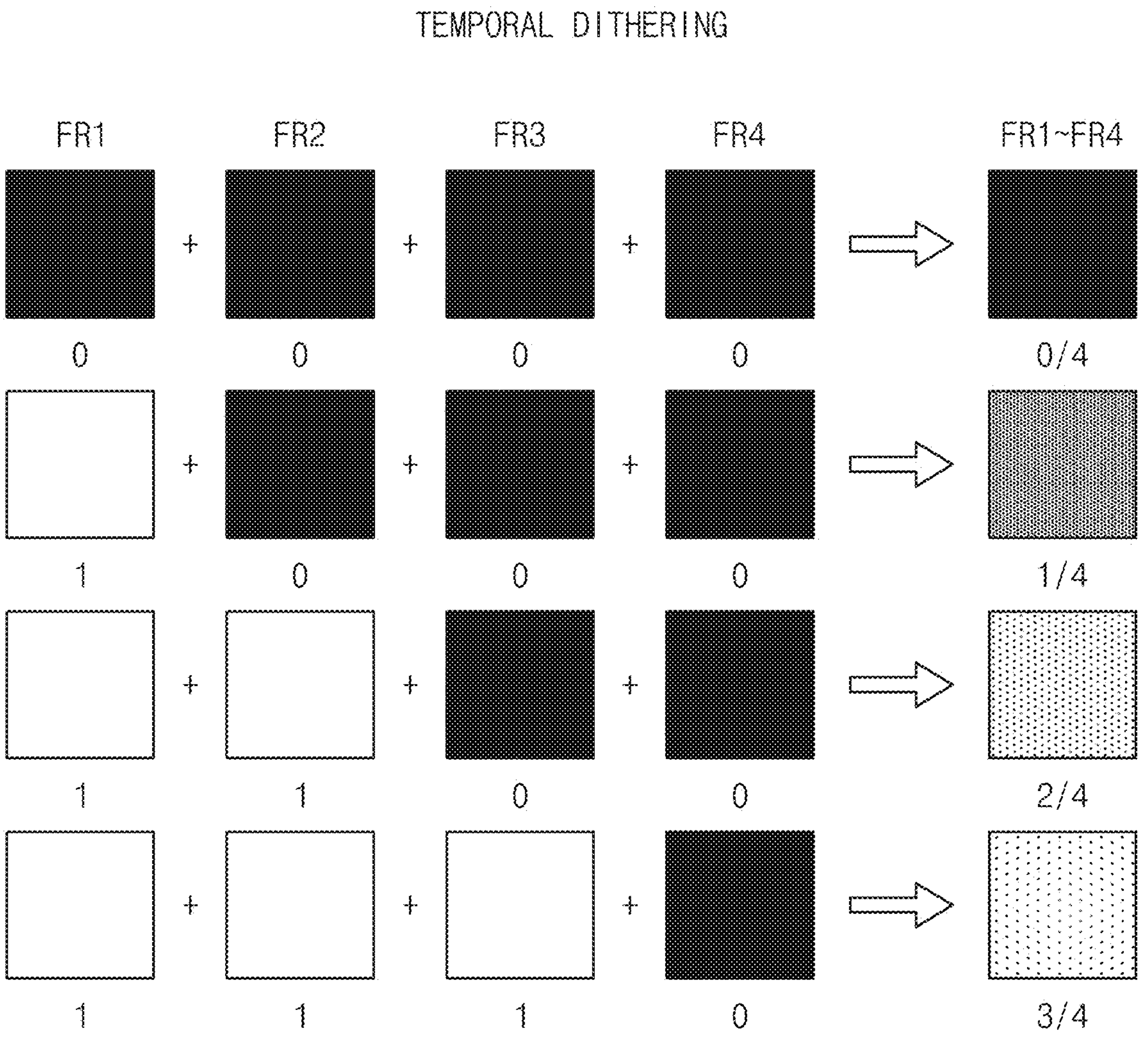
FIG. 2 is a conceptual diagram explaining a temporal dithering.
Figure 3:
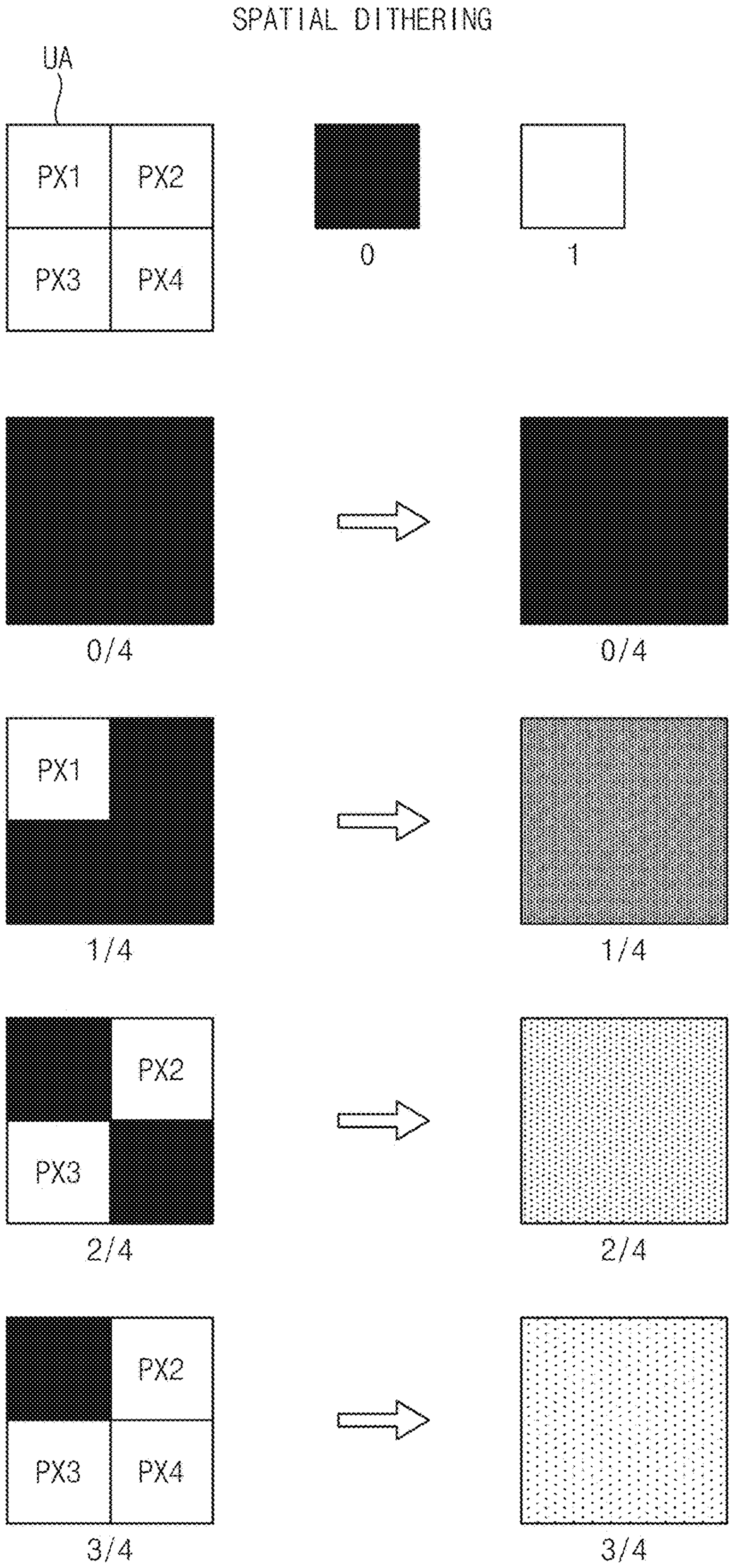
FIG. 3 is a conceptual diagram explaining a spatial dithering.

FIG. 2 is a conceptual diagram explaining an example of temporal dithering. FIG. 3 is a conceptual diagram explaining an example of spatial dithering.

Referring to FIG. 2 and FIG. 3, a grayscale of input image data IMG may have N bits (where N is a positive integer), and a data voltage VDATA output from a data driver 500 may have M bits (where M is a positive integer less than N). For example, the grayscale of the input image data IMG may have 8 bits (i.e., may be "8-bit data"), and the data voltage VDATA output from the data driver 500 may be 6-bit data. Thus, the grayscale of the input image data IMG may have grayscales from 0 to 255 in units of one grayscale (one 8-bit grayscale unit). On the other hand, the data voltage VDATA output from the data driver 500, when 6-bit data, may have grayscales from 0 to 255 in four grayscale units.

The display device 10 may perform a dithering operation to express N bits of the grayscale of the input image data IMG which is greater than M bits of the data voltage VDATA output from the data driver 500. Specifically, the display device 10 may express a target grayscale between a first reference grayscale "0" (a relatively low grayscale value) and a second reference grayscale "1" (a higher grayscale value) based on the first reference grayscale "0" and the second reference grayscale "1". Here, each of the first reference grayscale "0" and the second reference grayscale "1" may be a grayscale displayed by a pixel excited by the data voltage VDATA output from the data driver 500. For example, the first reference grayscale "0" may be 0 grayscale, and the second reference grayscale "1" may be 4 grayscale.

A method of performing the dithering operation may be temporal dithering and/or spatial dithering.

The temporal dithering method may display the first reference grayscale "0" and the second reference grayscale "1" during a plurality of frames to express the target grayscale between the first reference grayscale "0" and the second reference grayscale "1" by a temporal combination.

For example, when the first reference grayscale "0" is displayed during all frames FR1 to FR4 among first to fourth frames FR1 to FR4, the target grayscale "0/4" may be expressed. As such, the target grayscale "0/4" may be recognized by a user during the frames FR1 to FR4 as 0 grayscale.

For example, when the second reference grayscale "1" is displayed during one frame FR1 among the first to fourth frames FR1 to FR4, the target grayscale "1/4" may be expressed. Thus, during the frames FR1 to FR4, the target grayscale "1/4" may be recognized by the user. For example, the target grayscale "1/4" may be grayscale 1.

For example, when the second reference grayscale "1" is displayed during two frames FR1, FR2 among the first to fourth frames FR1 to FR4, the target grayscale "2/4" may be expressed. As a result, during the frames FR1 to FR4, the target grayscale "2/4" may be recognized by the user. For example, the target grayscale "2/4" may be 2 grayscale.

For example, when the second reference grayscale "1" is displayed during three frames FR1, FR2, FR3 among the first to fourth frames FR1 to FR4, the target grayscale "3/4" may be expressed. The target grayscale "3/4" may then be recognized by the user during the frames FR1 to FR4. For example, the target grayscale "3/4" may be 3 grayscale.

The spatial dithering method may display the first reference grayscale "0" and the second reference grayscale "1" on adjacent pixels PX to express the target grayscale between the first reference grayscale "0" and the second reference grayscale "1" by a spatial combination. Here, a map generated by combining the first reference grayscale "0" and the second reference grayscale "1" may be referred to as a dithering map. In an embodiment, the spatial dithering may be performed in units of unit area UA. That is, the dithering map may be generated in units of the unit area UA. Here, the unit area UA may be units of the adjacent pixels PX which express the target grayscale. For example, the unit area UA may include 2×2 pixels PX1 to PX4.

For example, when the first reference grayscale "0" is displayed in all pixels PX1 to PX4 of the 2×2 pixels PX1 to PX4, the target grayscale "0/4" may be expressed. The target grayscale "0/4" may then be recognized by the user in the unit area UA as 0 grayscale.

For example, when the second reference grayscale "1" is displayed in one pixel PX1 of the 2×2 pixels PX1 to PX4, the target grayscale "1/4" (i.e., 1 grayscale) may be expressed. In this case, the target grayscale "1/4" may be correctly recognized by the user in the unit area UA as 1 grayscale.

For example, when the second reference grayscale "1" is displayed in two pixels PX2, PX3 among the 2×2 pixels PX1 to PX4, the target grayscale "2/4" (i.e., 2 grayscale) may be expressed. In this case, the target grayscale "2/4" may be recognized by the user in the unit area UA as 2 grayscale.

For example, when the second reference grayscale "1" is displayed in three pixels PX2, PX3, PX4 among the 2×2 pixels PX1 to PX4, the target grayscale "3/4" may be expressed. The target grayscale "3/4" (3 grayscale) may then be recognized by the user in the unit area UA as 3 grayscale.

Meanwhile, when temporal dithering is performed during the frames, a flicker may be recognized by the user in a low frequency driving. Therefore, to prevent flicker in the low frequency driving, spatial dithering may be advantageous among the methods of performing the dithering operation.

However, even if the spatial dithering is performed, when the dithering map is selected with regularity, the display quality may be low. On the other hand, when the dithering map is selected randomly, the display quality may be improved.

However, even in this case, when the dithering cycle is a plurality of frames, the temporal dithering may be performed in addition to the spatial dithering, and as described above, the flicker may be recognized by the user in the low frequency driving.

In the driving controller 200, the display device 10, and a method of driving the driving controller 200 according to embodiments of the present inventive concept, the dithering map is randomly selected and the dithering cycle is one frame. Therefore, the spatial dithering may be performed without combining it with temporal dithering. Accordingly, these problems may be solved and the display quality may be improved. A more detailed description thereof will be given later.

Figure 4:
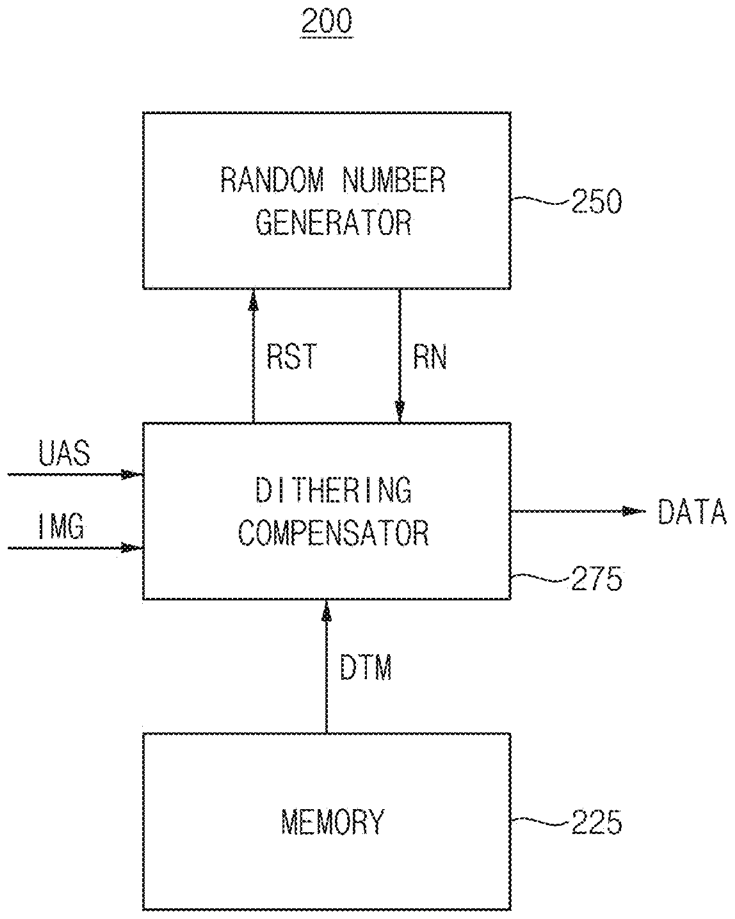
FIG. 4 is a block diagram showing a driving controller of FIG. 1.

FIG. 4 is a block diagram showing an example driving controller 200 of FIG. 1.

Referring to FIG. 4, a driving controller 200 may include a memory 225, a random number generator 250, and a dithering compensator circuit ("dithering compensator") 275.

The memory 225 may store dithering maps DTM.

The random number generator 250 may generate a random number RN. The random number RN may have X bits (where X is a positive integer). The random number generator 250 may initialize the random number RN based on a reset signal RST. Here, the random number RN may be initialized to a same initial value based on the reset signal RST for each frame. In an embodiment, the random number generator 250 may include a linear feedback shift register (LFSR). The linear feedback shift register is a digital circuit used to generate a random number.

The dithering compensator 275 may receive input image data IMG, the dithering maps DTM, and the random number RN. The dithering compensator may include processing circuitry to carry out its functionality. The dithering compensator 275 may further receive a unit area signal UAS. The unit area signal UAS may include information about a unit area UA.

The dithering compensator 275 may compensate (i.e., modify) the input image data IMG based on the dithering maps DTM, the random number RN, and the unit area signal UAS to generate a data signal DATA.

Specifically, the dithering compensator 275 may divide the pixels PX included in the display panel 100 into the unit area UA units based on the input image data IMG. The dithering compensator 275 may select a map index of Y bit(s) (where Y is a positive integer less than X) and a shift value of Z bits (where Z is a positive integer less than X) based on the random number RN. The dithering compensator 275 may select a grayscale "low bit" of the input image data IMG. As discussed above, a grayscale low bit may be a reference grayscale "0" (and correspond to a reference low grayscale value). The dithering compensator 275 may select an intermediate dithering map among the dithering maps based on the map index and the grayscale low bit. The dithering compensator 275 may shift the intermediate dithering map by the shift value to generate a compensation dithering map, and may compensate the input image data IMG using the compensation dithering map.

The dithering compensator 275 may generate the reset signal RST for each frame and provide the reset signal to the random number generator 250.

A grayscale of the input image data IMG may have N bits, and a data voltage VDATA output from a data driver 500 may have M bits. For example, the grayscale of the input image data IMG may have 8 bits ("8-bit grayscale"), and the data voltage VDATA output from the data driver 500 may have 4 bits ("4-bit data"). In this case, the grayscale of the input image data IMG may have grayscales from 0 to 255 in units of 1 grayscale. In addition, the data voltage VDATA output from the data driver 500 may have grayscales from 0 to 255 in units of 16 grayscale.

In this case, to express the grayscale of the input image data IMG based on the data voltage VDATA output from the data driver 500, each of the dithering maps DTM may have N−M bit(s), and the grayscale low bit (corresponding to a low reference grayscale) may be equal to a bit of each of the dithering maps DTM. For example, each of the dithering maps DTM may have 4 (=8−4) bits, and the grayscale "low bit" may have 4 bits (may have a value corresponding to 4-bit data). Based on this, the memory 225, the random number generator 250, and the dithering compensator 275 will be described in detail later.

Figure 5:
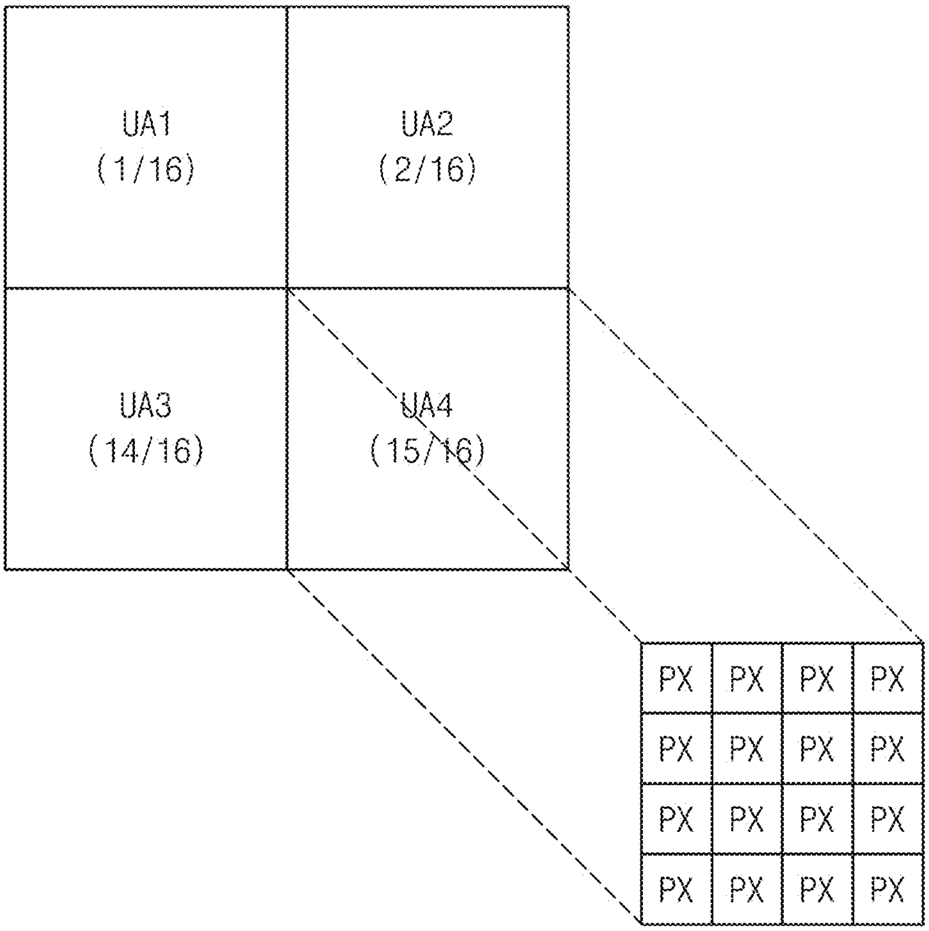
FIG. 5 is a diagram showing a target grayscale of each of unit areas and pixels included in each of the unit areas.

FIG. 5 is a diagram showing a target grayscale of each of unit areas UA1 to UA4 and pixels PX included in each of the unit areas UA1 to UA4.

Referring to FIG. 5, a dithering compensator 275 may receive input image data IMG and a unit area signal UAS. The unit area signal UAS may include information about a unit area UA.

The dithering compensator 275 may divide the pixels PX included in the display panel 100 into units of the unit area UA based on the input image data IMG.

For example, the input image data IMG may have a 2×2 resolution, and the pixels PX included in the display panel 100 may have an 8×8 resolution. The dithering compensator 275 may divide the pixels PX having the 8×8 resolution into 2×2 unit areas (lower resolution areas) UA1 to UA4. Therefore, each of the 2×2 unit areas UA1 to UA4 may include 4×4 pixels PX. Each of the 2×2 unit areas UA1 to UA4 may have a target grayscale. Since the 4×4 pixels PX display at least one first reference grayscale and at least one second reference grayscale adjacent to the at least one first reference grayscale, the target grayscale may be recognized by the user in each of the 2×2 unit areas UA1 to UA4.

For example, a first reference grayscale "0" may be 0 grayscale, and a second reference grayscale "1" may be 16 grayscale. In this case, the target grayscale may be a value between 0 grayscale and 16 grayscale, which are low grayscales. For example, a target grayscale "1/16" of a first unit area UA1 may be 1 grayscale, a target grayscale "2/16" of a second unit area UA2 may be 2 grayscale, a target grayscale "14/16" of a third unit area UA3 may be 14 grayscale, and a target grayscale "15/16" of a fourth unit area UA4 may be 15 grayscale.

FIG. 6 is a diagram showing example dithering maps DTM stored in a memory 225 of FIG. 4.

Referring to FIG. 6, a memory 225 may store dithering maps DTM, and a target grayscale TG may be expressed for the unit area UA based on each of the dithering maps DTM.

For example, a first reference grayscale "0" may be 0 grayscale, and a second reference grayscale "1" may be 16 grayscale. In this case, the target grayscale TG may be a value between 0 grayscale and 16 grayscale, which are low grayscales. When the target grayscale TG is 0 grayscale (i.e., "0/16"), a grayscale low bit "LSB" of 0 grayscale may be "0000", and the first reference grayscale "0" may be displayed in all pixels among the pixels PX included in each of the dithering maps DTM. Accordingly, the target grayscale TG of 0 grayscale in the unit area UA may be recognized by the user. In this case, a map index (i.e., index value) MID corresponding to the grayscale low bit LSB of "0000" may be 0 to 3.

For example, the first reference grayscale "0" may be 0 grayscale, and the second reference grayscale "1" may be 16 grayscale. When the target grayscale TG is 1 grayscale (i.e., "1/16"), a grayscale low bit LSB of 1 grayscale may be "0001", and the second reference grayscale "1" may be displayed in one pixel among the pixels PX included in each of the dithering maps DTM. Accordingly, the target grayscale TG of 1 grayscale may be recognized by the user in the unit area UA. In this case, a map index MID corresponding to the grayscale low bit LSB of "0001" may be 0 to 3, each index corresponding to a different position for the one pixel having the single reference grayscale "1" within the unit area UA.

For example, the first reference grayscale "0" may be 0 grayscale, and the second reference grayscale "1" may be 16 grayscale. When the target grayscale TG is 2 grayscale (i.e., "2/16"), a grayscale low bit LSB of the 2 grayscale may be "0010", and the second reference grayscale "1" may be displayed in two pixels among the pixels PX included in each of the dithering maps DTM. Accordingly, the target grayscale TG of 2 grayscale may be recognized by the user in the unit area UA. In this case, a map index MID corresponding to the grayscale low bit LSB of "0010" may be 0 to 3, where each index corresponds to a different combination of positions for pixels having the two 1's in the unit area UA.

For example, the first reference grayscale "0" may be 0 grayscale, and the second reference grayscale "1" may be 16 grayscale. When the target grayscale TG is 14 grayscale (i.e., "14/16"), a grayscale low bit LSB of 14 grayscale may be "1110", and the second reference grayscale "1" may be displayed in fourteen pixels among the pixels PX included in each of the dithering maps DTM. Accordingly, the target grayscale TG of 14 grayscale may be recognized by the user in the unit area UA. In this case, a map index MID corresponding to the grayscale low bit LSB of "1110" may be 0 to 3.

For example, the first reference grayscale "0" may be 0 grayscale, and the second reference grayscale "1" may be 16 grayscale. When the target grayscale TG is 15 grayscale (i.e., "15/16"), a grayscale low bit LSB of 15 grayscale may be "1111", and the second reference grayscale "1" may be displayed in fifteen pixels among the pixels PX included in each of the dithering maps DTM. Accordingly, the target grayscale TG of 15 grayscale may be recognized by the user in the unit area UA. In this case, a map index MID corresponding to the grayscale low bit LSB of "1111" may be 0 to 3.

A number of the dithering maps DTM may be $2^Y \times 2^{N-M}$. For example, Y is 2, N is 8, and when M is 4 (4 bit), the number of the dithering maps DTM may be 64 ($=2^2 \times 2^{8-4}$). However, the present inventive concept is not limited thereto. For example, Y may be greater than 2. As Y increases, the number of the dithering maps DTM may increase, and a performance of the dithering operation may be improved. However, a capacity of the dithering maps DTM stored in the memory 225 may increase.

Figure 7:
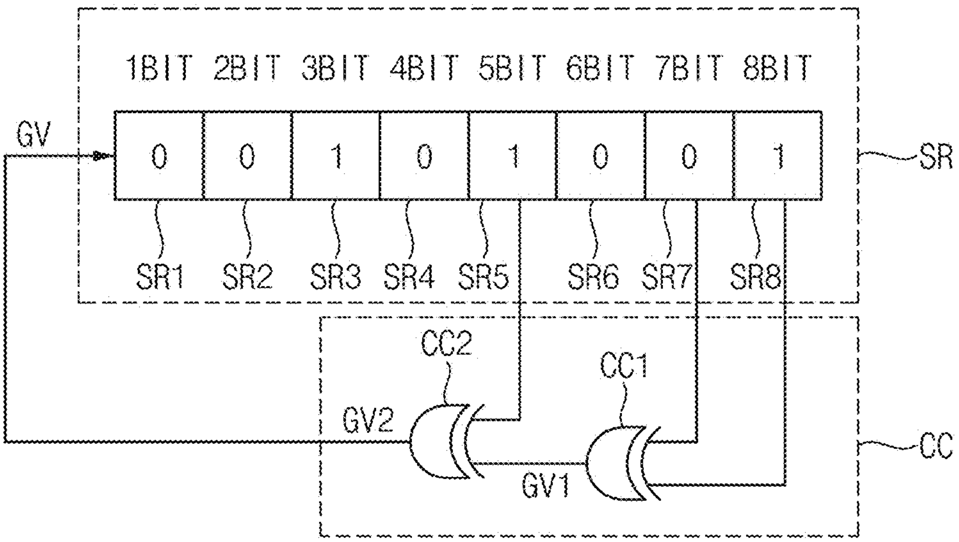
FIG. 7 is a diagram explaining an operation of a random number generator of FIG. 4.

FIG. 7 is a diagram explaining an operation of a random number generator 250 of FIG. 4.

Referring to FIG. 7, a random number generator 250 may include a linear feedback shift register LFSR. The linear feedback shift register LFSR is a digital circuit which is used when generating a random number RN. When dithering maps DTM are randomly selected based on the random number RN generated based on the linear feedback shift register LFSR, display quality may be improved.

The linear feedback shift register LFSR may include shift registers SR and a calculator CC.

The shift registers SR may include first to X-th shift registers. The first to X-th shift registers may collectively generate numbers corresponding to first to X-th bits. The random number RN may be determined based on the numbers corresponding to the first to X-th bits. Therefore, the random number RN may have X bits. For example, the shift registers SR may include first to eighth shift registers SR1 to SR8. The first to eighth shift registers SR1 to SR8 may generate numbers corresponding to first to eighth bits. Therefore, the random number RN may have 8 bits.

The calculator CC may generate a current random number based on a previous random number. For example, the calculator CC may include a first calculator CC1 and a second calculator CC2. Each of the first calculator CC1 and the second calculator CC2 may be an XOR logic gate. The XOR logic gate may output an output signal based on a first input signal and a second input signal. When the first input signal and the second input signal are each 0, the output signal may be 0. When the first input signal is 0 and the second input signal is 1, the output signal may be 1. When the first input signal is 1 and the second input signal is 0, the output signal may be 1. When the first input signal and the second input signal are each 1, the output signal may be 0. For example, as illustrated in FIG. 7, the first calculator CC1 may output a first generation value GV1 based on a number corresponding to the seventh bit of the seventh shift register SR7 and a number corresponding to the eighth bit of the eighth shift register SR8. For example, the second calculator CC2 may output a second generation value GV2 based on a number corresponding to the fifth bit of the fifth shift register SR5 and the first generation value GV1 output by the first calculator CC1. The numbers corresponding to the first to X-th bits of the first to X-th shift registers may be shifted, and the second generation value GV2 may be output as a generation value GV and input as the number of the first bit of the first shift register SR1.

The random number RN may be initialized to a same initial value based on the reset signal RST for each frame of a frame sequence. Accordingly, a dithering cycle may be one frame.

The random number RN may be used to change, within a unit area UA, a location of at least one pixel emitting an intensity of the first reference grayscale or the second reference grayscale, for each dithering cycle. The random changes from cycle to cycle (e.g., from frame to frame when the cycle is one frame), the actual change in the display image due to the random number may not be noticeable to a user. A maximum cycle of the random number RN may be $2^X-1$. Here, X is the number of bits of the random number RN. For example, when X is 8, the cycle of the random number RN may be 255, i.e., the same random number RN may occur after 255 dithering cycles. Meanwhile, the random number RN may be generated multiple times during one frame, rather than once per frame as in the example above. For example, the random number RN may be generated four times during one frame. Therefore, in a first frame, when first to fourth random numbers are generated and the random number RN is not initialized with a same initial value, in a second frame, the first to fourth random numbers may not be generated and fifth to eighth random numbers may be generated. Since the previous random number and the next random number are related, when the random number RN is not initialized with a same initial value based on the reset signal RST for each frame, a display device 10 may perform a temporal dithering as well as a spatial dithering. As described above, the temporal dithering may cause a flicker to be recognized by a user in a low frequency driving. Therefore, the random number RN may be initialized with a same initial value for each frame such that the display device 10 may perform only spatial dithering and deleterious effects associated with temporal dithering may be eliminated.

For example, one frame may include first to fourth time points at which the random number changes.

For example, at the first time point, the initial value may be “00101001”, which may be the first random number (which changed from a previous one).

For example, at the second time point, the previous random number may be “00101001”. The number corresponding to the seventh bit of the seventh shift register SR7 may be 0, and the number corresponding to the eighth bit of the eighth shift register SR8 may be 1. Therefore, the first calculator CC1 may output 1 as the first generation value GV1. The number corresponding to the fifth bit of the fifth shift register SR5 may be 1, and the first generation value GV1 of the first calculator CC1 may be 1. Therefore, the second calculator CC1 may output 0 as the second generation value GV2, and the generation value GV may be 0. The previous random number “00101001” may be shifted, and the generation value GV “0” may be input as the number of the first bit of the first shift register SR1. Therefore, the current random number may be “00010100”, which may be the second random number.

It follows that at a third time point, the previous random number may be “00010100.” The number corresponding to the seventh bit of the seventh shift register SR7 may be 0, and the number corresponding to the eighth bit of the eighth shift register SR8 may be 0. Therefore, the first calculator CC1 may output 0 as the first generation value GV1. The number corresponding to the fifth bit of the fifth shift register SR5 may be 0, and the first generation value GV1 of the first calculator CC1 may be 0. Therefore, the second calculator CC2 may output 0 as the second generation value GV2, and the generation value GV may be 0. The previous random number “00010100” may be shifted, and the generation value GV “0” may be input as the number of the first bit of the first shift register SR1. Therefore, the current random number may be “00001010”, which may be the third random number.

For example, at a fourth time point, the previous random number may be “00001010”. The number corresponding to the seventh bit of the seventh shift register SR7 may be 1, and the number corresponding to the eighth bit of the eighth shift register SR8 may be 0. Therefore, the first calculator CC1 may output 1 as the first generation value GV1. The number corresponding to the fifth bit of the fifth shift register SR5 may be 1, and the first generation value GV1 of the first calculator CC1 may be 1. Therefore, the second calculator CC1 may output 0 as the second generation value GV2, and the generation value GV may be 0. The previous random number “00001010” may be shifted, and the generation value GV “0” may be input as the number of the first bit of the first shift register SR1. Therefore, the current random number may be “00000101”, which may be the fourth random number.

Figure 8:
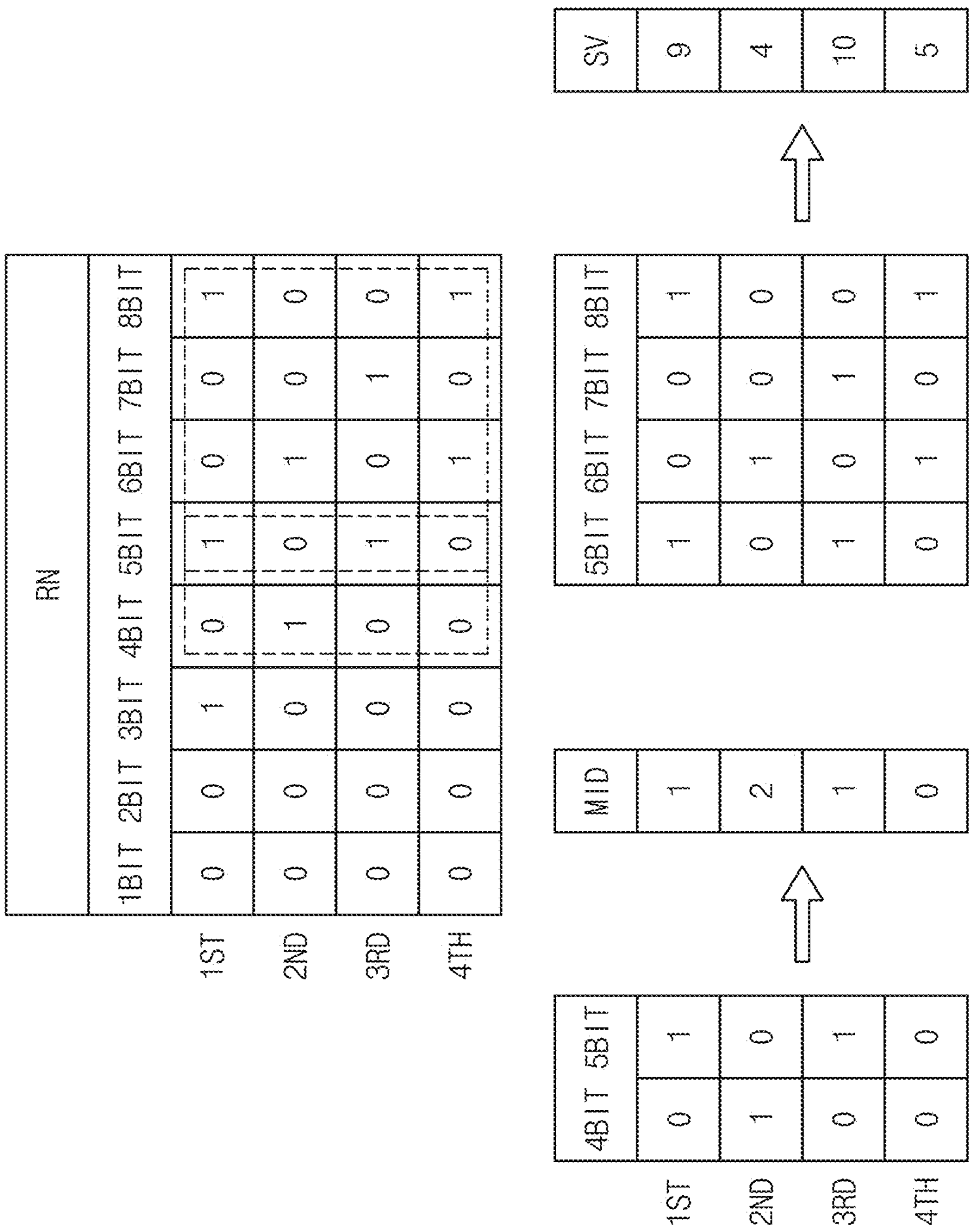
FIG. 8 is a diagram explaining an operation of selecting a map index and a shift value of a dithering compensator of FIG. 4.

FIG. 8 is a diagram explaining an operation of selecting a map index MID and a shift value SV of a dithering compensator 275 of FIG. 4.

Referring to FIG. 8, a dithering compensator 275 may select a map index MID of Y bit(s) and a shift value SV of Z bits based on a random number RN of X bits.

The dithering compensator 275 may select a portion of X binary numbers (hereafter, just “numbers”) included in the random number RN as the map index MID. In an embodiment, the portion of the X numbers included in the random number RN selected as the map index MID may be adjacent to each other. The portion of the X numbers included in the random number RN selected as the map index MID may be Y numbers.

For example, Y may be 2, and a number corresponding to a fourth bit and a number corresponding to a fifth bit among numbers included in the random number RN may be selected as the map index MID. For example, as shown in FIG. 8, when the random number RN is “00101001”, the map index MID may be 1. For example, when the random number RN is “00010100”, the map index MID may be 2. For example, when the random number RN is “00001010”, the map index MID may be 1. For example, when the random number RN is “00000101”, the map index MID may be 0.

In an embodiment, Z bits of the shift value SV may correspond to a number of pixels PX included in the unit area UA. The dithering compensator 275 may select a portion of the X numbers included in the random number RN as the shift value SV. In an embodiment, the portion of the X numbers included in the random number RN selected as the shift value SV may be adjacent to each other. The portion of the X numbers included in the random number RN selected as the shift value SV may be Z binary numbers.

For example, Z may be 4, and among numbers included in the random number RN, the number corresponding to the fifth bit, a number corresponding to a sixth bit, a number corresponding to a seventh bit, and a number corresponding to the eighth bit may be selected as the shift value SV. For example, when the random number RN is "00101001", the shift value SV may be 9 (as shown in the lower half of FIG. 8). For example, when the random number RN is "00010100", the shift value SV may be 4. For example, when the random number RN is "00001010", the shift value SV may be 10. For example, when the random number RN is "00000101", the shift value SV may be 5.

Figure 9:
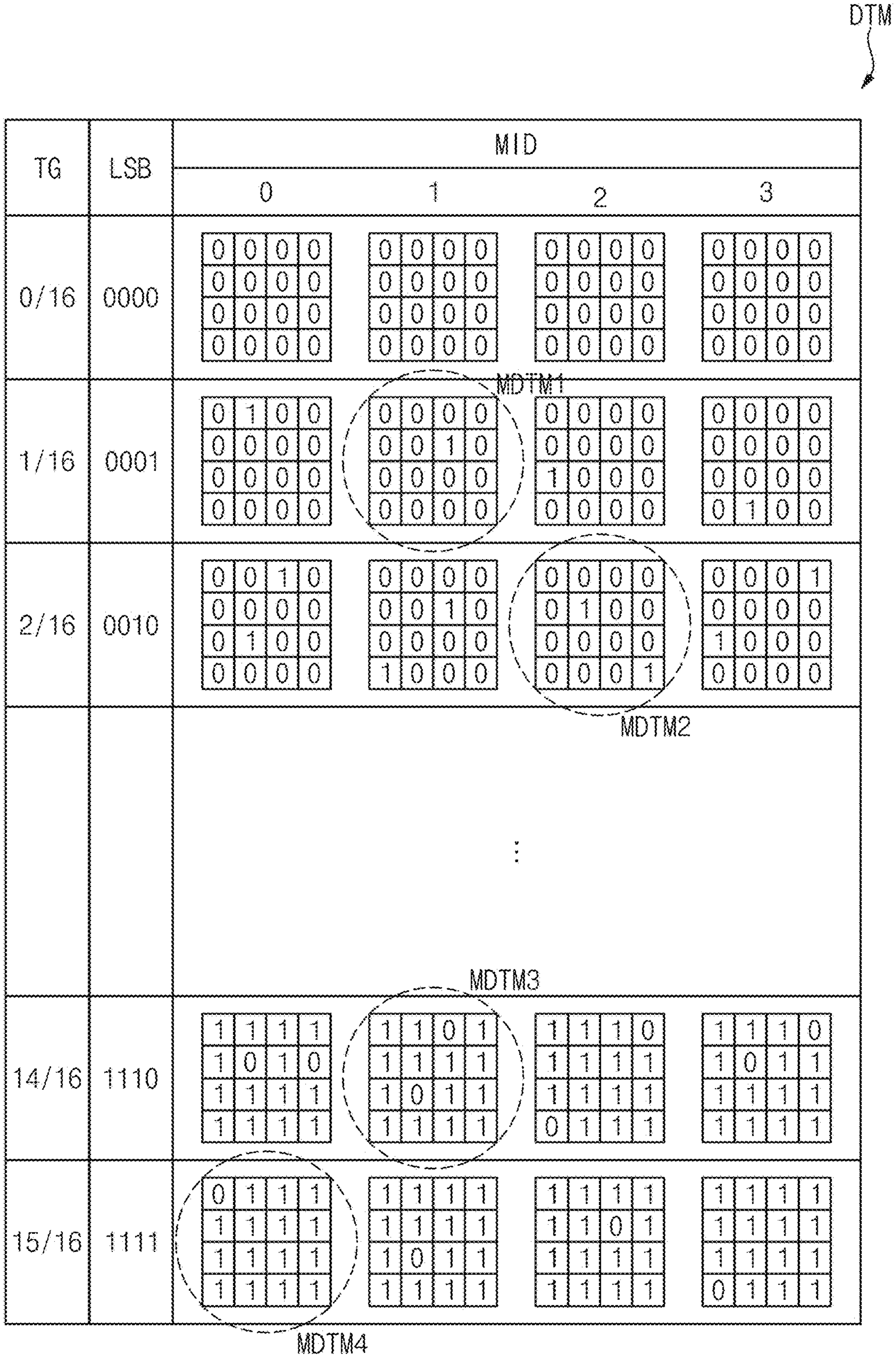
FIG. 9 is a diagram explaining an operation of selecting an intermediate dithering map of a dithering compensator of FIG. 4.
Figure 10:
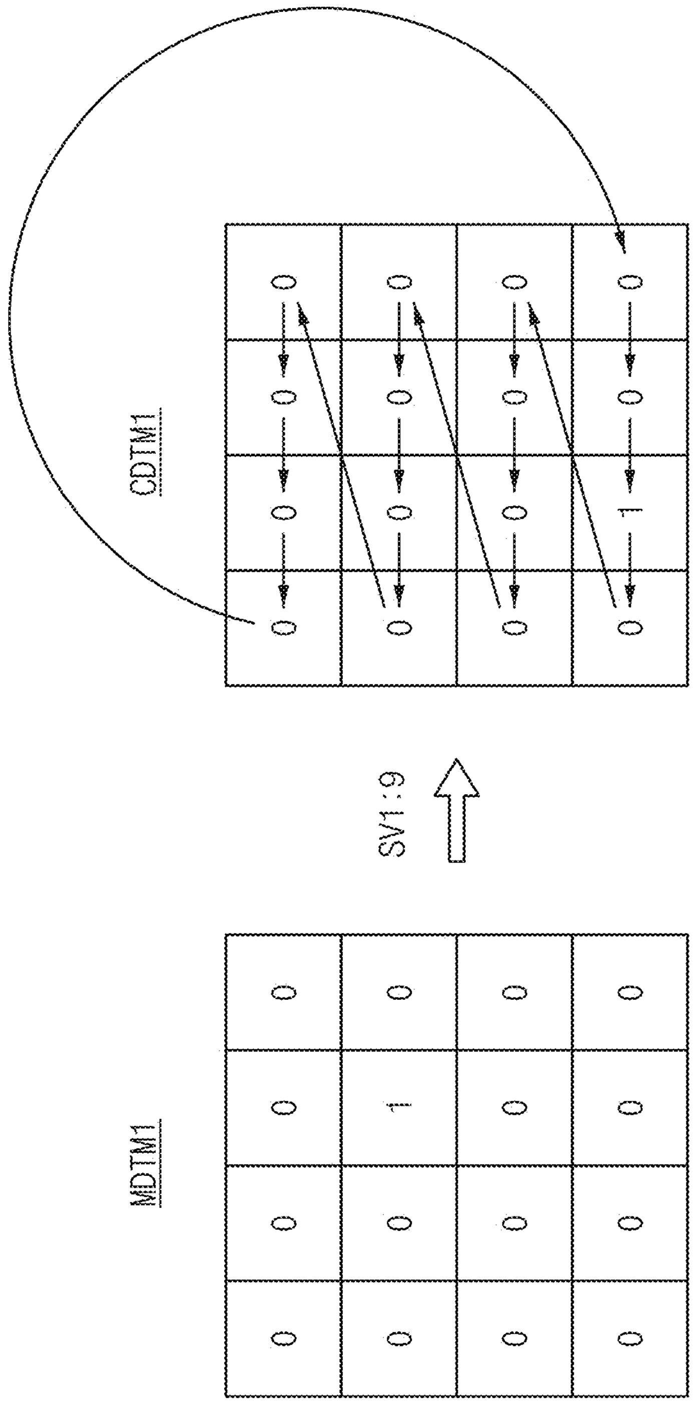
FIGS. 10, 11, 12 and 13 are diagrams explaining an operation of generating a compensation dithering map by shifting an intermediate dithering map of a dithering compensator of FIG. 4.
Figure 11:
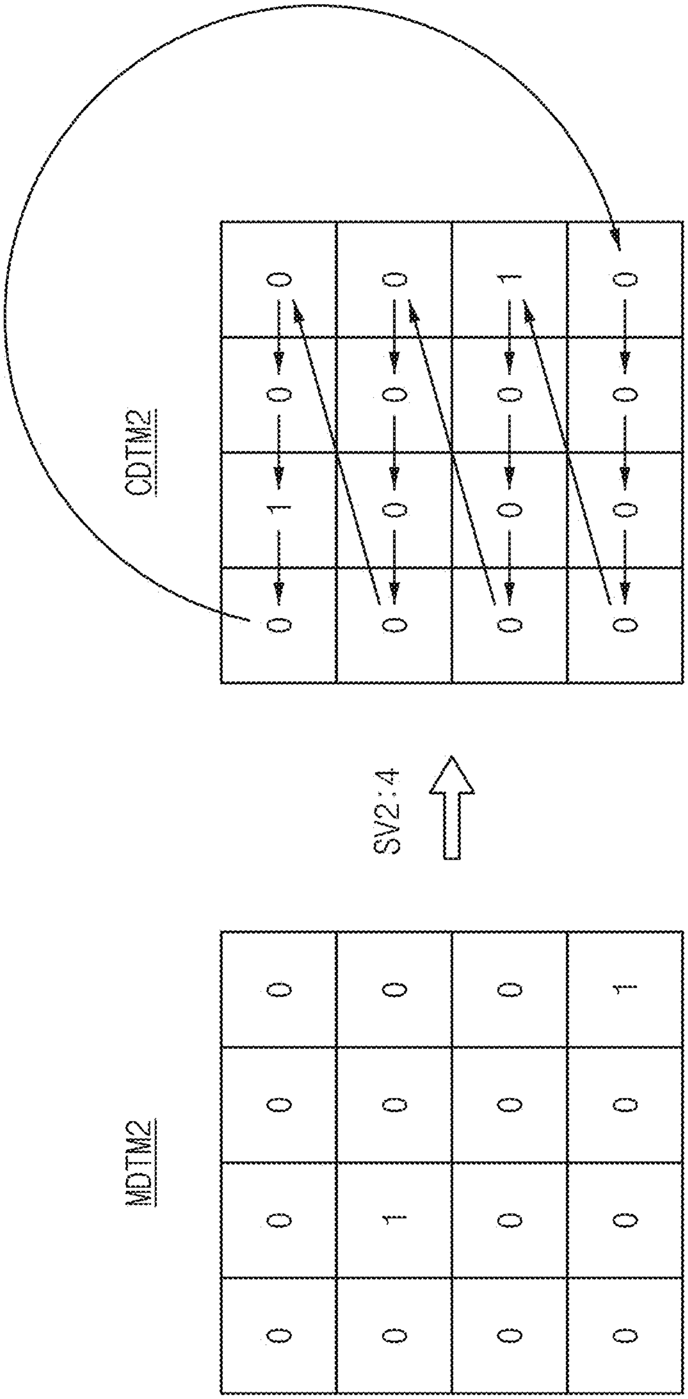
Figure 12:
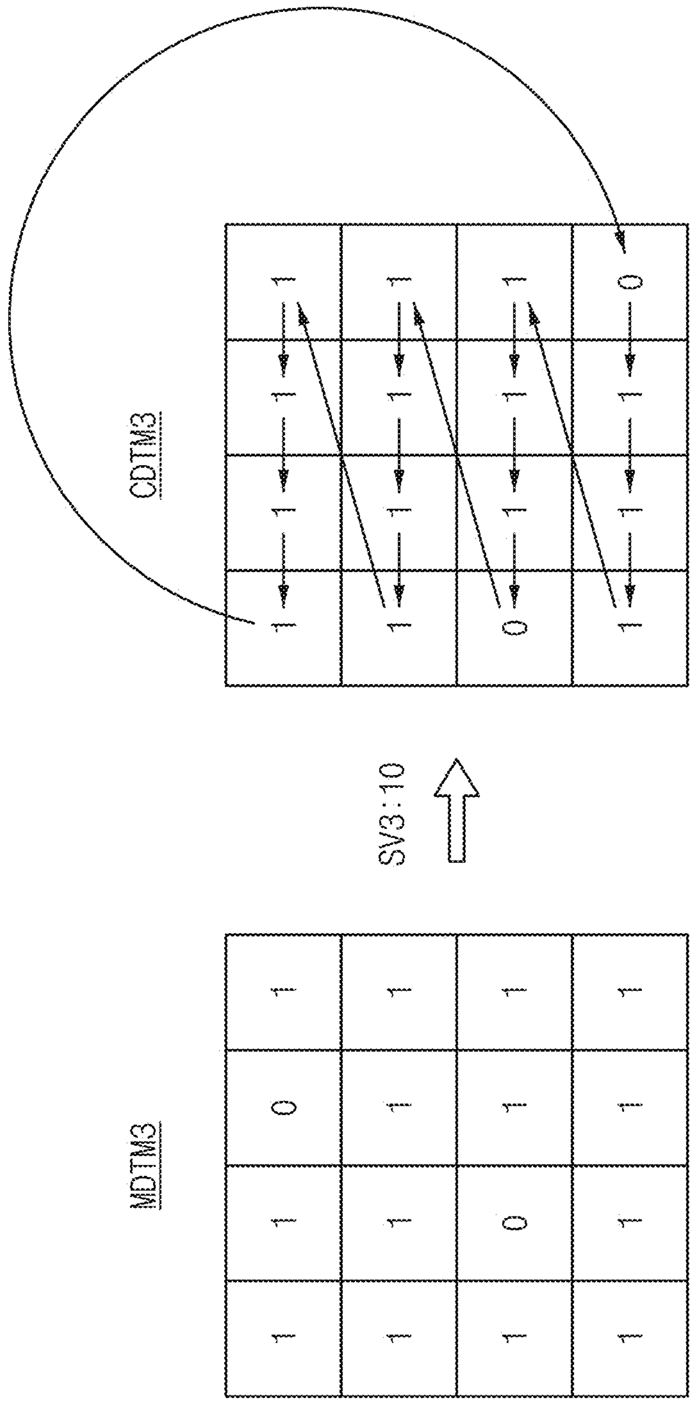
Figure 13:
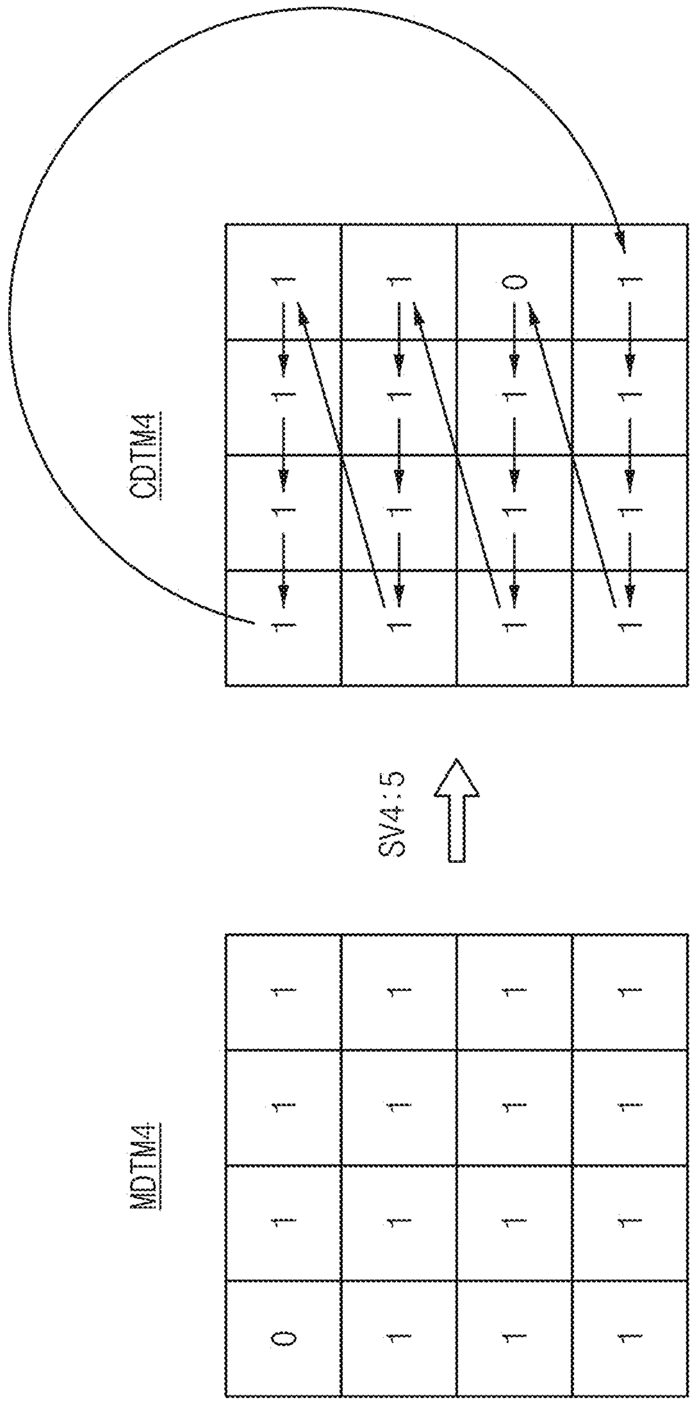

FIG. 9 is a diagram explaining an operation of selecting an "intermediate dithering map", e.g., any one of MDTM1, MDTM2, MDTM3, MDTM4, of a dithering compensator 275 of FIG. 4. Herein, an intermediate dithering map may be any dithering map that has at least one "0" and at least one "1" (e.g., any dithering map in FIG. 9 except for the "all 0's" maps).

Referring to FIG. 8 and FIG. 9, a dithering compensator 275 may select an intermediate dithering map MDTM1, MDTM2, MDTM3, MDTM4 among dithering maps DTM based on a map index MID and a grayscale low bit LSB.

For example, when the map index MID is 1 and a grayscale low bit LSB is "0001", the dithering compensator 275 may select a first intermediate dithering map MDTM1 among the dithering maps DTM.

For example, when the map index MID is 2 and the grayscale low bit LSB is "0010", the dithering compensator 275 may select a second intermediate dithering map MDTM2 among the dithering maps DTM.

For example, when the map index MID is 1 and the grayscale low bit LSB is "1110", the dithering compensator 275 may select a third intermediate dithering map MDTM3 among the dithering maps DTM.

For example, when the map index MID is 0 and the grayscale low bit LSB is "1111", the dithering compensator 275 may select a fourth intermediate dithering map MDTM4 among the dithering maps DTM.

FIGS. 10 to 13 are diagrams explaining an operation of generating a "compensation dithering map", e.g., any of CDTM1, CDTM2, CDTM3, CDTM4 by shifting an intermediate dithering map MDTM1, MDTM2, MDTM3, MDTM4, respectively, of a dithering compensator 275 of FIG. 4. A compensation dithering map may be a dithering map that has been modified from an intermediate dithering map, and thereafter used to compensate an image using spatial dithering.

Referring to FIGS. 10 to 13, a dithering compensator 275 may shift an intermediate dithering map MDTM1, MDTM2, MDTM3, MDTM4 by a shift value SV to generate a compensation dithering map CDTM1, CDTM2, CDTM3, CDTM4, and may compensate input image data IMG using the compensation dithering map CDTM1, CDTM2, CDTM3, CDTM4. In an embodiment, a shift direction may be a horizontal direction (intra-row) and row to row, as shown in FIGS. 10-13. In another embodiment, the shift direction may be a vertical direction. However, the present inventive concept is not limited thereto, and the shift direction may be any suitable direction.

For example, a shift value SV1 for a first intermediate dithering map MDTM1 may be 9, and the shift direction may be the horizontal direction, right to left, lower row to upper row except for the uppermost row, which shifts to the lowermost row. Therefore, the first intermediate dithering map MDTM1 may be shifted by 9 in the horizontal direction to generate a first compensation dithering map CDTM1.

For example, a shift value SV2 for a second intermediate dithering map MDTM2 may be 4, and the shift direction may be the horizontal direction. Therefore, the second intermediate dithering map MDTM2 may be shifted by 4 in the horizontal direction to generate a second compensation dithering map CDTM2.

For example, a shift value SV1 for a third intermediate dithering map MDTM3 may be 10, and the shift direction may be the horizontal direction. Therefore, the third intermediate dithering map MDTM3 may be shifted by 10 in the horizontal direction to generate a third compensation dithering map CDTM3.

For example, a shift value SV4 for a fourth intermediate dithering map MDTM4 may be 5, and the shift direction may be the horizontal direction. Therefore, the fourth intermediate dithering map MDTM4 may be shifted by 5 in the horizontal direction to generate a fourth compensation dithering map CDTM4.

A maximum value of the shift value SV may correspond to a number of pixels PX included in each of the intermediate dithering maps MDTM. Since the dithering maps DTM may be shifted by the maximum value of the shift value SV, the number of the compensation dithering maps CDTM1, CDTM2, . . . that may be extended from any of the intermediate dithering maps may equal the maximum value of the shift value SV.

For example, when the number of the pixels PX included in each of the dithering maps DTM is 16, the maximum value of the shift value SV may be 16. Since the dithering maps DTM are shifted by 16, a number of the compensation dithering maps CDTM1, CDTM2, . . . may be extended by 16 times from each intermediate dithering map. Accordingly, spatial dithering may be performed more randomly (as compared to allowing only less than 16 extensions to different mappings). In addition, since a shift operation is performed through an operation of the dithering compensator 275, an amount of data stored in a memory 225 may not increase.

Figure 14:
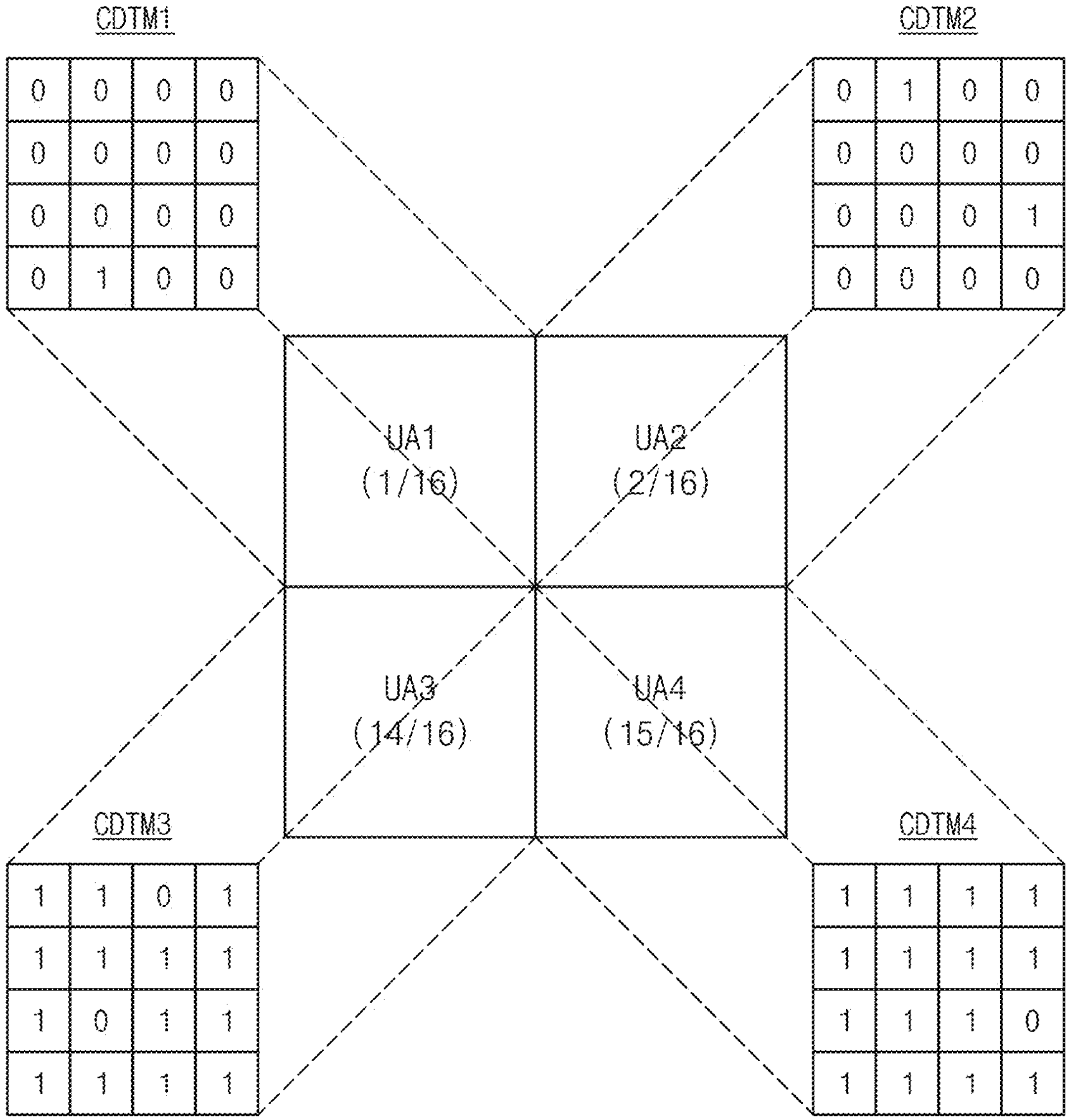
FIG. 14 is a diagram explaining an operation of compensating input image data using compensation dithering maps of a dithering compensator of FIG. 4.

FIG. 14 is a diagram explaining an operation of compensating input image data IMG using compensation dithering maps CDTM1, CDTM2, CDTM3, CDTM4 of a dithering compensator 275 of FIG. 4.

Referring to FIG. 14, a dithering compensator 275 may compensate input image data IMG using a compensation dithering map CDTM1, CDTM2, CDTM3, CDTM4.

For example, a first reference grayscale "0" may be 0 grayscale, and a second reference grayscale "1" may be 16 grayscale. When a target grayscale TG of a first unit area UA1 is 1 grayscale (i.e., "1⁄16") and a compensation dithering map of the first unit area UA1 is a first compensation dithering map CDTM1 having the second reference grayscale "1" in one pixel of 4×4 pixels PX, the first compensation dithering map CDTM1 may be applied to the first unit area UA1 such that the target grayscale TG of 1 grayscale may be recognized by the user in the first unit area UA1.

For example, the first reference grayscale "0" may be 0 grayscale, and the second reference grayscale "1" may be 16 grayscale. When a target grayscale TG of a second unit area UA2 is 2 grayscale (i.e., "2⁄16") and a compensation dithering map of the second unit area UA2 is a second compensation dithering map CDTM2 having the second reference grayscale "1" in two pixels among 4×4 pixels PX, the second compensation dithering map CDTM2 may be applied to the second unit area UA2 such that the target grayscale TG of 2 grayscale may be recognized by the user in the second unit area UA2.

For example, the first reference grayscale "0" may be 0 grayscale, and the second reference grayscale "1" may be 16 grayscale. When a target grayscale TG of a third unit area UA3 is 14 grayscale (i.e., "14⁄16") and a compensation dithering map of the third unit area UA3 is a third compensation dithering map CDTM3 having the second reference grayscale "1" in fourteen pixels out of 4×4 pixels PX, the third compensation dithering map CDTM3 may be applied to the third unit area UA3 such that the target grayscale TG of 14 grayscale may be recognized by the user in the third unit area UA3.

For example, the first reference grayscale "0" may be 0 grayscale, and the second reference grayscale "1" may be 16 grayscale. When a target grayscale TG of a fourth unit area UA4 is 15 grayscale (i.e., "15/16") and a compensation dithering map of the fourth unit area UA4 is a fourth compensation dithering map CDTM4 having the second reference grayscale "1" in fifteen pixels among 4×4 pixels PX, the fourth compensation dithering map CDTM4 may be applied to the fourth unit area UA4 such that the target grayscale TG of 15 grayscale may be recognized by the user in the fourth unit area UA4.

As such, in a driving controller 200, a display device 10, and the method of driving the driving controller 200, a dithering map DTM may be randomly selected based on a random number RN, and a spatial dithering may be performed based on the dithering map DTM. In addition, since the random number RN is initialized with a same initial value for each frame, a dithering cycle may be one frame, the spatial dithering may be performed for each frame, and a temporal dithering may not be performed.

A maximum value of the shift value SV may correspond to a number of pixels PX included in each of the dithering maps DTM. Since the dithering maps DTM may be shifted by the maximum value of the shift value SV, a number of the compensation dithering maps CDTM1, CDTM2, . . . may be extended by the maximum value of the shift value SV from each of the dithering maps DTM. Accordingly, the spatial dithering may be performed more randomly. In addition, since a shift operation is performed through an operation of the dithering compensator 275, an amount of data stored in a memory 225 may not increase.

Figure 15:
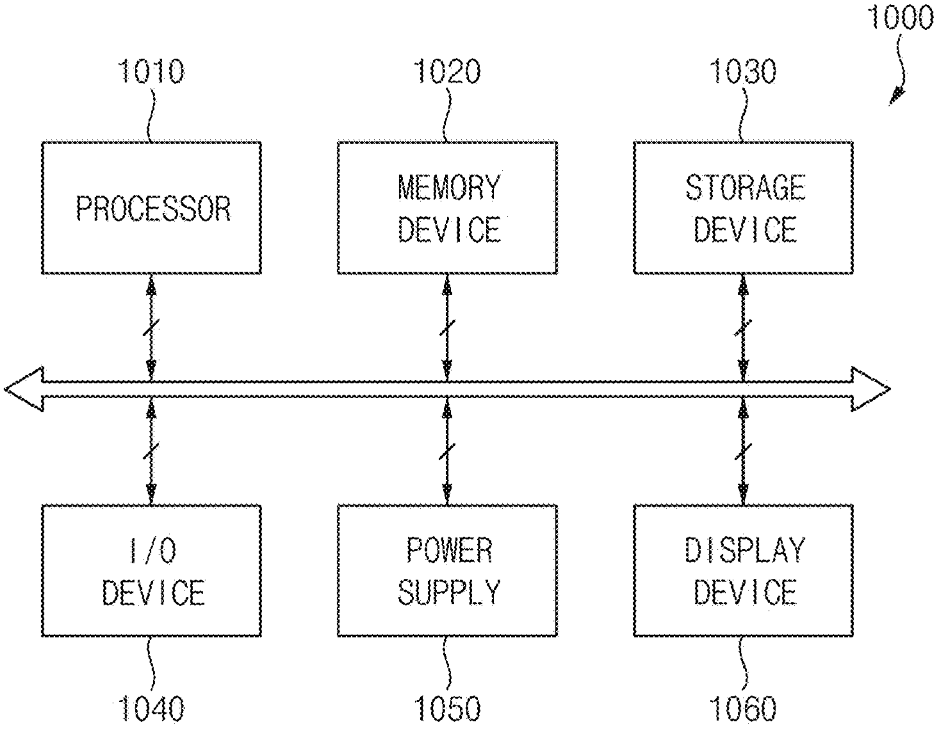
FIG. 15 is a block diagram illustrating an electronic device.
Figure 16:
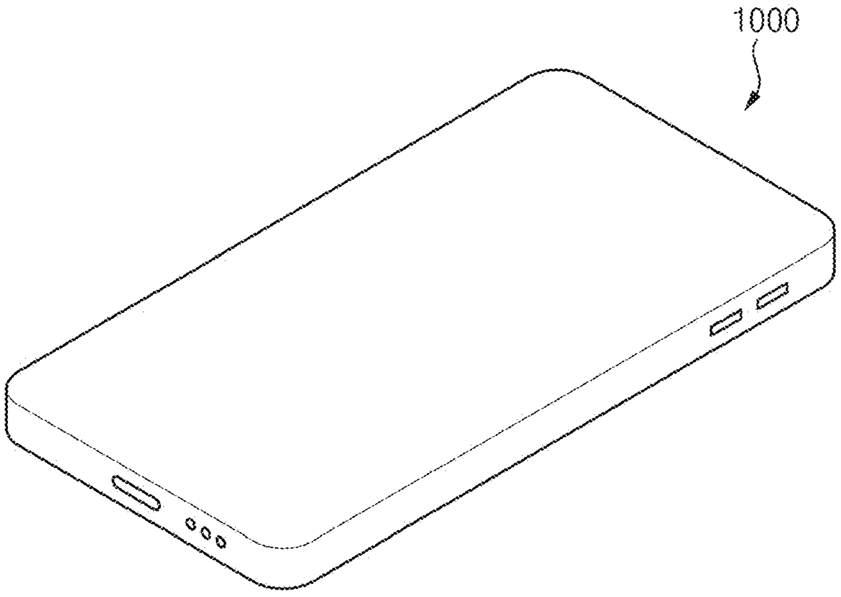
FIG. 16 is a diagram illustrating an embodiment in which the electronic device of FIG. 15 is implemented as a smart phone.

FIG. 15 is a block diagram illustrating an electronic device 1000. FIG. 16 is a diagram illustrating an embodiment in which the electronic device 1000 of FIG. 15 is implemented as a smart phone.

Referring to FIGS. 15 and 16, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as shown in FIG. 16, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a microprocessor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, any means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A driving controller of a display device, comprising:

a memory configured to store dithering maps;

a random number generator configured to generate a random number having a same initial value for each of a plurality of frames; and a dithering compensator circuit configured to: (i) select an intermediate dithering map among the dithering maps based on the random number, the intermediate dithering map including a sequence of positions each having a bit value, and (ii) shift the intermediate dithering map by shifting each of the bit values therein from a respective initial position by a number of positions in the sequence equal to a same shift value that is based on the random number to generate a compensation dithering map, and spatially compensate input image data using the compensation dithering map.

2. The driving controller of claim 1, wherein the random number has X bits, where X is a positive integer, and the dithering compensator circuit is configured to select a map index of Y at least one bit, where Y is a positive integer less than X, and a shift value of Z bits, where Z is a positive integer less than X, based on the random number, select a grayscale low bit of the input image data, select the intermediate dithering map among the dithering maps based on the map index and the grayscale low bit, and shift the intermediate dithering map by the shift value to generate the compensation dithering map.

3. The driving controller of claim 2, wherein the dithering compensator circuit is configured to select a portion of the X bits included in the random number as the map index.

4. The driving controller of claim 3, wherein the portion of the X bits included in the random number selected as the map index are adjacent to each other.

5. The driving controller of claim 2, wherein each of the dithering maps has N−M bits, where N is a positive integer and M is a positive integer less than N, when a grayscale of the input image data is N-bit and a data voltage output from a data driver is M-bit.

6. The driving controller of claim 5, wherein the grayscale low bit is equal to a bit of each of the dithering maps.

7. The driving controller of claim 6, wherein a number of the dithering maps is $2^Y \times 2^{N-M}$.

8. The driving controller of claim 2, wherein the dithering compensator circuit is configured to select a portion of X numbers included in the random number as the shift value.

9. The driving controller of claim 8, wherein the portion of the X numbers included in the random number selected as the shift value are adjacent to each other.

10. The driving controller of claim 2, wherein a maximum value of the shift value corresponds to a number of pixels included in each of the dithering maps.

11. The driving controller of claim 10, wherein a number of compensation dithering maps equaling the maximum value of the shift value are derived from each of a plurality of intermediate dithering maps.

12. The driving controller of claim 1, wherein a dithering cycle performed by the driving controller is one frame.

13. The driving controller of claim 1, wherein the compensation dithering map is generated by at least partially horizontally shifting the intermediate dithering map.

14. The driving controller of claim 1, wherein the compensation dithering map is generated by at least partially vertically shifting the intermediate dithering map.

15. A display device, comprising:

a display panel including pixels;

a data driver configured to provide a data voltage to the display panel; and a driving controller configured to control the data driver, wherein the driving controller includes:

a memory configured to store dithering maps;

a random number generator configured to generate a random number having a same initial value for each of a plurality of frames; and a dithering compensator circuit configured to: (i) select an intermediate dithering map among the dithering maps based on the random number, the intermediate dithering map including a sequence of positions each having a bit value, and (ii) shift the intermediate dithering map by shifting each of the bit values therein from a respective initial position by a number of positions in the sequence equal to a same shift value that is based on the random number to generate a compensation dithering map, and spatially compensate input image data using the compensation dithering map.

16. The display device of claim 15, wherein the random number has X bits, where X is a positive integer, and the dithering compensator circuit is configured to select a map index of Y at least one bit, where Y is a positive integer less than X, and a shift value of Z bits, where Z is a positive integer less than X, based on the random number, select a grayscale low bit of the input image data, select the intermediate dithering map among the dithering maps based on the map index and the grayscale low bit, and shift the intermediate dithering map by the shift value to generate the compensation dithering map.

17. The display device of claim 16, wherein a plurality of random numbers are applied for dithering during each of the plurality of frames.

18. The display device of claim 15, wherein a dithering cycle performed by the driving controller is one frame.

19. An electronic device, comprising:

a display panel including pixels;

a data driver configured to provide a data voltage to the display panel;

a driving controller configured to control the data driver; and a power supply configured to provide a power to the display panel, the data driver, and the driving controller, wherein the driving controller includes:

a memory configured to store dithering maps;

a random number generator configured to generate a random number having a same initial value for each of a plurality of frames; and a dithering compensator circuit configured to select an intermediate dithering map among the dithering maps based on the random number, shift the intermediate dithering map based on the random number to generate a compensation dithering map, and spatially compensate input image data using the compensation dithering map, wherein the random number has X bits, where X is a positive integer, and the dithering compensator circuit is configured to select a map index of Y at least one bit, where Y is a positive integer less than X, and a shift value of Z bits, where Z is a positive integer less than X, based on the random number, select a grayscale low bit of the input image data, select the intermediate dithering map among the dithering maps based on the map index and the grayscale low bit, and shift the intermediate dithering map by the shift value to generate the compensation dithering map.

20. A method of driving a driving controller of a display device, the method comprising:

generating a random number having a same initial value for each frame;

selecting an intermediate dithering map among dithering maps based on the random number, the intermediate dithering map including a sequence of positions each having a bit value;

shifting the intermediate dithering map by shifting each of the bit values therein from a respective initial position by a number of positions in the sequence equal to a same shift value that is based on the random number to generate a compensation dithering map; and spatially compensating input image data using the compensation dithering map.

* * * * *